(12) United States Patent
Suhara

(10) Patent No.: US 10,942,357 B2
(45) Date of Patent: Mar. 9, 2021

(54) LIGHT ILLUMINATION DEVICE, LIGHT PROCESSING APPARATUS USING LIGHT ILLUMINATION DEVICE, LIGHT ILLUMINATION METHOD, AND LIGHT PROCESSING METHOD

(71) Applicant: Ricoh Company, Ltd., Tokyo (JP)

(72) Inventor: Hiroyuki Suhara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 80 days.

(21) Appl. No.: 16/268,540

(22) Filed: Feb. 6, 2019

(65) Prior Publication Data

US 2019/0258067 A1    Aug. 22, 2019

(30) Foreign Application Priority Data

Feb. 21, 2018    (JP) .............................. JP2018-028866

(51) Int. Cl.
*G02B 27/09*    (2006.01)
*G02B 19/00*    (2006.01)
(Continued)

(52) U.S. Cl.
CPC .......... *G02B 27/0927* (2013.01); *B23K 26/00* (2013.01); *B23K 26/073* (2013.01);
(Continued)

(58) Field of Classification Search
CPC .. G02B 27/00235; G02B 27/09; G02B 26/06; B23K 26/073; B23K 26/00
See application file for complete search history.

(56) References Cited

U.S. PATENT DOCUMENTS

| | | | |
|---|---|---|---|
| 5,661,712 A * | 8/1997 | Chiba | G02F 1/133345 349/143 |
| 6,509,995 B1 * | 1/2003 | Suzuki | G02B 26/128 359/207.1 |

(Continued)

FOREIGN PATENT DOCUMENTS

| | | |
|---|---|---|
| CN | 103069328 A | 4/2013 |
| CN | 105980912 A | 9/2016 |

(Continued)

OTHER PUBLICATIONS

European Search Report dated Jul. 26, 2019, issued in corresponding European Patent Application No. 19153791.9, 8 pages.
Office Action dated Nov. 25, 2020 in Chinese Patent Application No. 201910121041.9, 10 pages.

*Primary Examiner* — Robert E. Tallman
(74) *Attorney, Agent, or Firm* — Xsensus LLP

(57) ABSTRACT

A light illumination device, a light processing apparatus using the light illumination device, a light illumination method, and a light processing method. The light illumination device, the light illumination method, and the light processing method include converting a phase distribution of a transmitted wavefront of light emitted from a light source, changing a ratio between a first diameter of a cross section perpendicular to an optical axis of the light whose phase distribution of the transmitted wavefront is converted in the converting along a first axis and a second diameter along a second axis perpendicular to the first axis and the optical axis of the light, and condensing the light whose ratio between the first diameter and the second diameter is changed in the changing.

9 Claims, 14 Drawing Sheets

(51) Int. Cl.
*G02B 26/08* (2006.01)
*G02B 26/10* (2006.01)
*G02B 27/00* (2006.01)
*G02F 1/1343* (2006.01)
*G02F 1/137* (2006.01)
*G02B 26/06* (2006.01)
*B23K 26/00* (2014.01)
*B23K 26/073* (2006.01)

(52) U.S. Cl.
CPC ......... *G02B 19/0047* (2013.01); *G02B 26/06* (2013.01); *G02B 26/0816* (2013.01); *G02B 26/101* (2013.01); *G02B 27/0025* (2013.01); *G02B 27/09* (2013.01); *G02B 27/0911* (2013.01); *G02B 27/0961* (2013.01); *G02B 27/0972* (2013.01); *G02F 1/137* (2013.01); *G02F 1/13439* (2013.01); *G02F 2203/01* (2013.01); *G02F 2203/50* (2013.01)

(56) References Cited

U.S. PATENT DOCUMENTS

| | | | |
|---|---|---|---|
| 2001/0053033 A1* | 12/2001 | Bolt | G02B 26/0883 |
| | | | 359/831 |
| 2014/0293388 A1 | 10/2014 | Matsumoto et al. | |
| 2017/0082845 A1* | 3/2017 | Chen | G02B 21/0048 |
| 2017/0115656 A1 | 4/2017 | Ottnad et al. | |
| 2017/0205611 A1 | 7/2017 | Fukuyama | |
| 2018/0257173 A1 | 9/2018 | Suhara | |

FOREIGN PATENT DOCUMENTS

| | | |
|---|---|---|
| DE | 102013225310 B3 | 5/2015 |
| JP | 2010-075997 | 4/2010 |
| JP | 2017-148853 | 8/2017 |
| JP | 2017-219342 | 12/2017 |
| WO | 0109660 A2 | 2/2001 |

\* cited by examiner

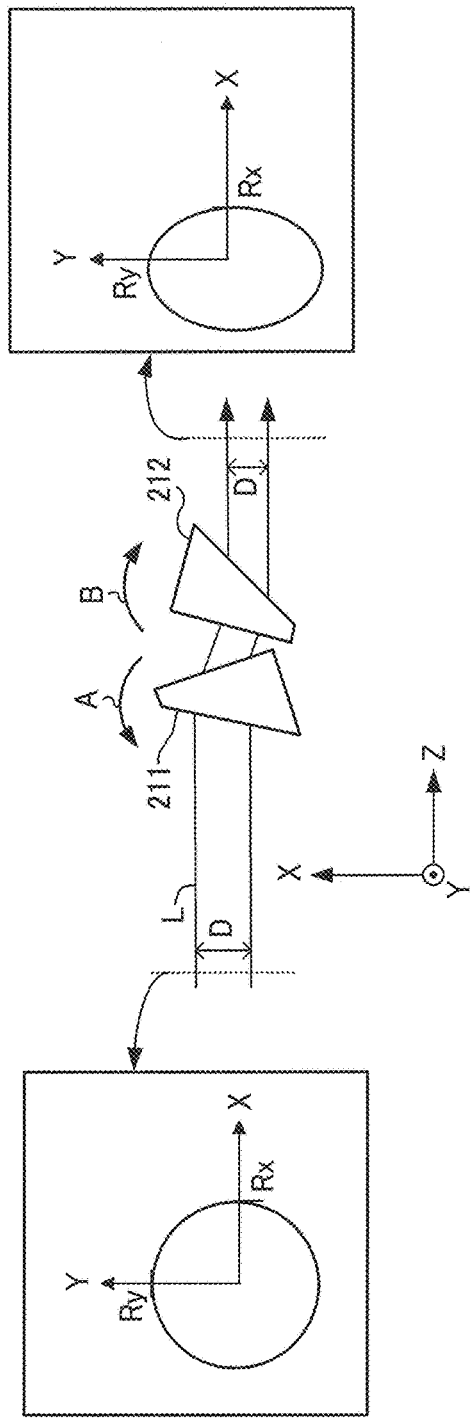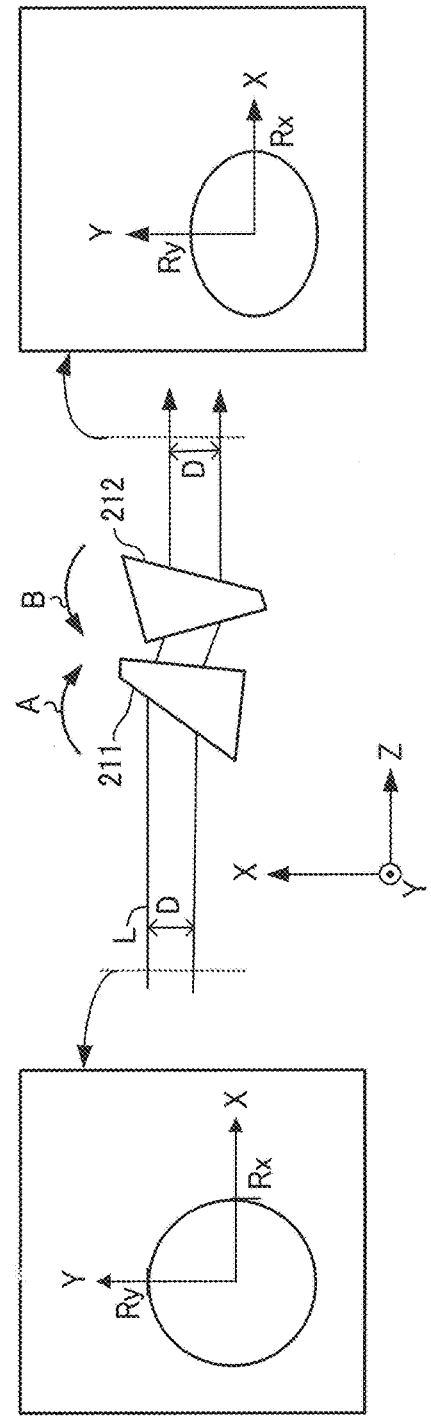

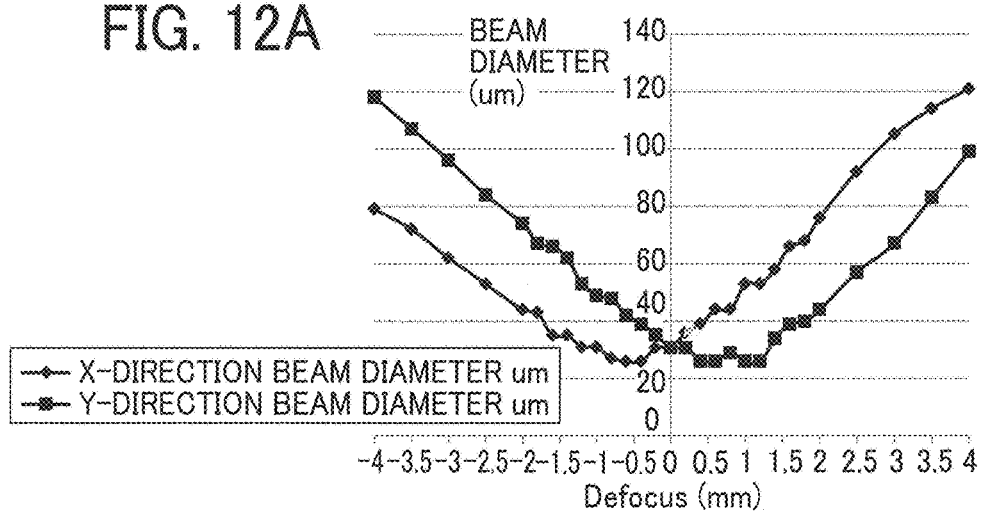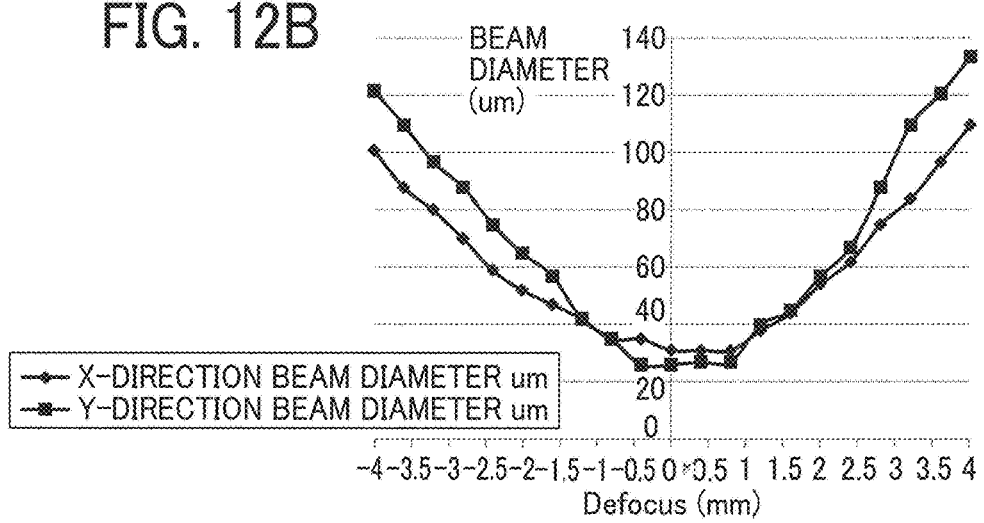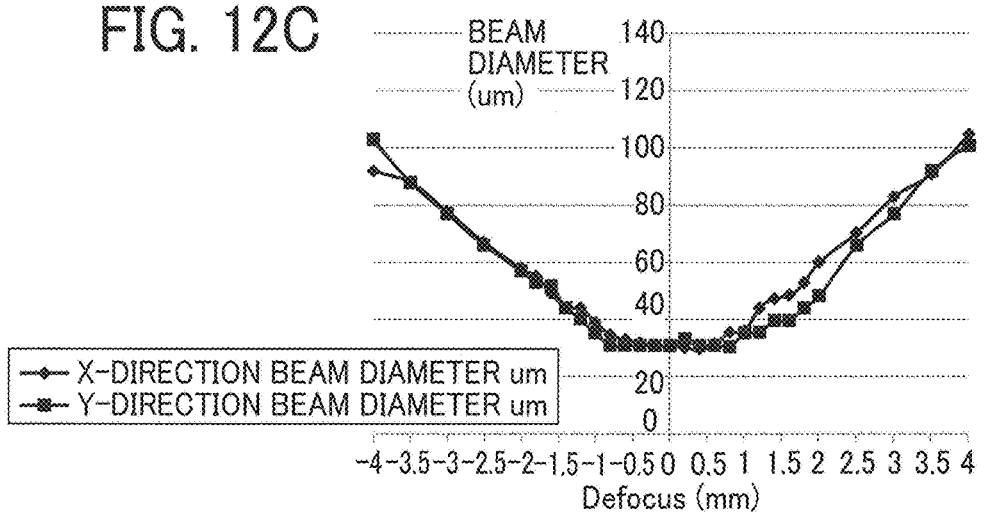

LIGHT ILLUMINATION DEVICE, LIGHT PROCESSING APPARATUS USING LIGHT ILLUMINATION DEVICE, LIGHT ILLUMINATION METHOD, AND LIGHT PROCESSING METHOD

CROSS-REFERENCE TO RELATED APPLICATION

This patent application is based on and claims priority pursuant to 35 U.S.C. § 119(a) to Japanese Patent Application No. 2018-028866, filed on Feb. 21, 2018, in the Japan Patent Office, the entire disclosure of which is hereby incorporated by reference herein.

BACKGROUND

Technical Field

The present disclosure relates to a light illumination device, a light processing apparatus using the light illumination device, a light illumination method, and a light processing method.

Description of the Related Art

In the field of micromachining or the like, a laser processing technology of emitting laser light to process an object is known. In order to precisely perform such micromachining, there is a demand for control that maintains a beam shape at a convergence position in a stable and ideal beam shape.

Therefore, regarding the beam shape, a beam profile is converted into, for example, a high-quality Gaussian beam profile, top-hat beam profile, Laguerre beam profile, or Bessel beam profile to irradiate an object with the beam. Examples of means for converting the beam profile into a top-hat beam profile include an aspherical lens type that converts a beam into a columnar top-hat beam and a diffractive optical element (DOE) that converts a beam into a rectangular top-hat beam.

SUMMARY

Embodiments of the present disclosure described herein provide a light illumination device, a light processing apparatus using the light illumination device, a light illumination method, and a light processing method. The light illumination device, the light illumination method, and the light processing method include converting a phase distribution of a transmitted wavefront of light emitted from a light source, changing a ratio between a first diameter of a cross section perpendicular to an optical axis of the light whose phase distribution of the transmitted wavefront is converted in the converting along a first axis and a second diameter along a second axis perpendicular to the first axis and the optical axis of the light, and condensing the light whose ratio between the first diameter and the second diameter is changed in the changing.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 3A and 3B each illustrate an operation of the beam resizing device illustrated in FIG. 2;

FIGS. 12A and 12C are graphs illustrating exemplary outputs of the light illumination device illustrated in FIG. 11, and FIG. 12B is a graph illustrating a comparative example of the light illumination device illustrated in FIG. 11;

Figure 1:
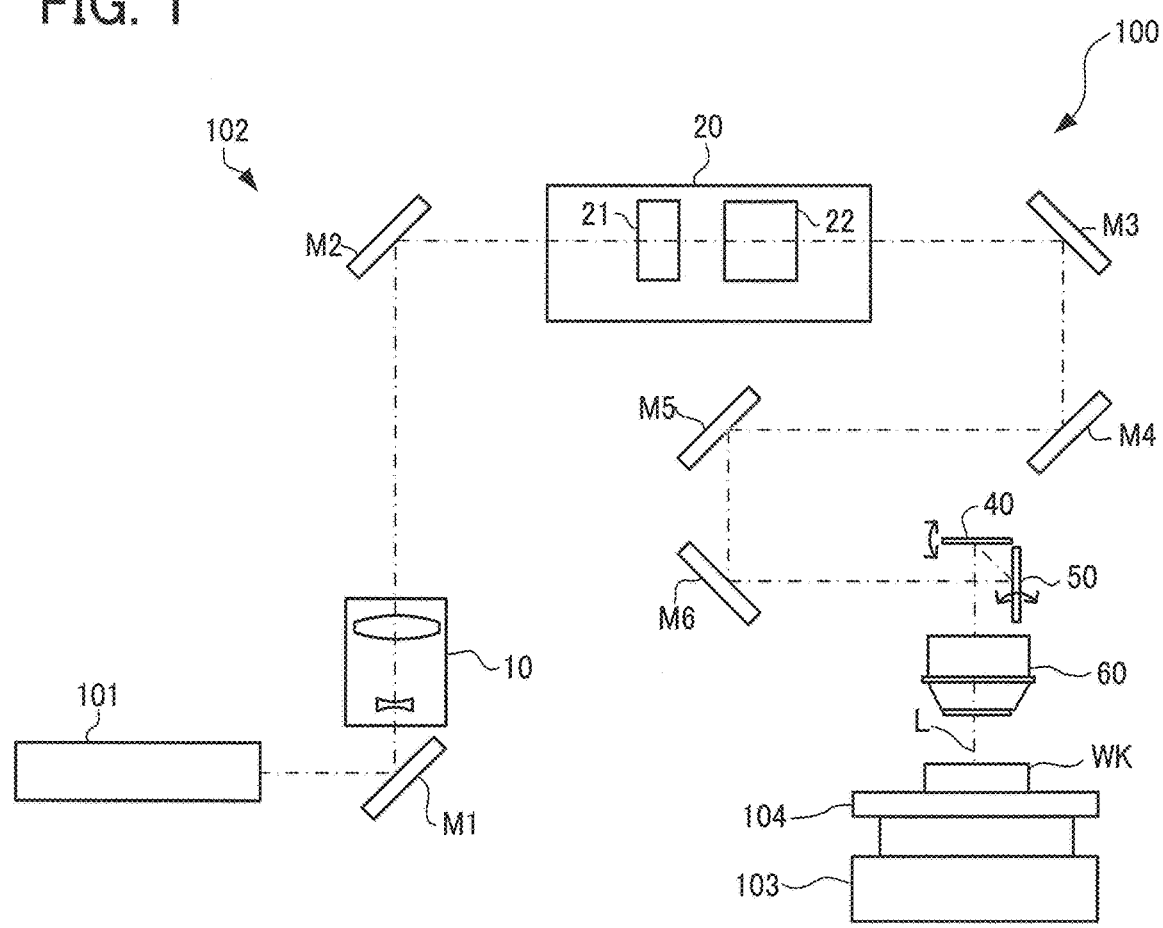
FIG. 1 illustrates a schematic structure of a light illumination device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A light illumination device and a light processing apparatus using the light illumination device according to embodiments of the present disclosure are described below with reference to the drawings.

In the present embodiment, as illustrated in FIG. 1, a light illumination device 100 functions as a laser processing apparatus for irradiating a surface of a workpiece WK, which is an object to be processed, or a part of the surface of the workpiece WK with laser light to acquire an object processed by the light.

The light illumination device 100 includes a light source 101, which is a laser oscillator, an illumination optical system 102 for converging and adjusting laser light emitted from the light source 101, a workpiece table 103 for disposing the workpiece WK thereon, and a movable stage 104 for adjusting the position of the workpiece WK.

In the present embodiment, a direction of an optical axis of laser light L is defined as a direction of a Z axis, and two directions perpendicular to the optical axis are an X direction and a Y direction. Therefore, a "cross section perpendicular to the optical axis" refers to an XY plane. When a "first axis in the cross section perpendicular to the optical axis" is defined as being in the Y direction, a "second axis in the cross section orthogonal to the optical axis and the first axis" is defined as being in the X direction. In the present embodiment, as illustrated in FIG. 1, the illumination optical system 102 changes the direction of propagation of the laser light L; however, since the direction of propagation can be changed as appropriate by the design of the illumination optical system 102 or by the position of the workpiece WK, the direction of the optical axis is expressed as the direction of the Z axis in either of these cases.

In the present embodiment, the light source 101 is a pulse laser oscillator that generates pulsed light of 100 picoseconds or less and that undergoes little damage caused by the influence of heat on the workpiece WK. In the present embodiment, particularly as an example, a case in which the wavelength is 532 nm, the maximum output is 8 W, the frequency is 200 kHz, and the beam diameter after expansion by a beam expander (BEX) 10 described below is 3 mm is described.

The illumination optical system 102 includes a plurality of mirrors M1 to M6, the beam expander 10 that is disposed between the mirror M1 and the mirror M2 and that enlarges the diameter of the laser light L emitted from the light source 101, and beam profile controller 20 disposed between the mirror M2 and the mirror M3.

The illumination optical system 102 also includes an X deflecting mirror 40 and a Y deflecting mirror 50, which are used in adjusting the position of the optical axis of the laser light L, and a condenser lens 60 for converging the laser light L to any convergence position on the workpiece WK.

Although, in the present embodiment, a structure using six mirrors, that is, the mirrors M1 to M6, is used, a structure using 10 or more mirrors may be used. Therefore, the number of such mirrors is not limited.

The workpiece WK is placed on the workpiece table 103. The movable stage 104 holds the workpiece WK such that the workpiece WK is movable biaxially on the XY plane that is perpendicular to the optical axis of the laser light L.

A beam diameter of the laser light L emitted from the light source 101 is enlarged by the beam expander 10, and then the enlarged laser light L is transmitted through the beam profile controller 20 to adjust a beam profile of the light beam to any one of various beam profiles (described below) of the light beam.

The X deflecting mirror 40 and the Y deflecting mirror 50 finely adjust the laser light L so as to be symmetrical with respect to the center of the optical axis, after which the condenser lens 60 causes the laser light L to illuminate any convergence position P on the workpiece WK.

By using the laser light L that has illuminated the workpiece WK, the workpiece WK is processed.

The beam profile controller 20 includes beam resizing device 21, which is first light controller, for changing an aspect ratio in an incident beam cross section of the laser light L, and beam wavefront converter 22, which is second light controller, for converting a phase distribution of a transmitted wavefront of the laser light L.

Figure 2:
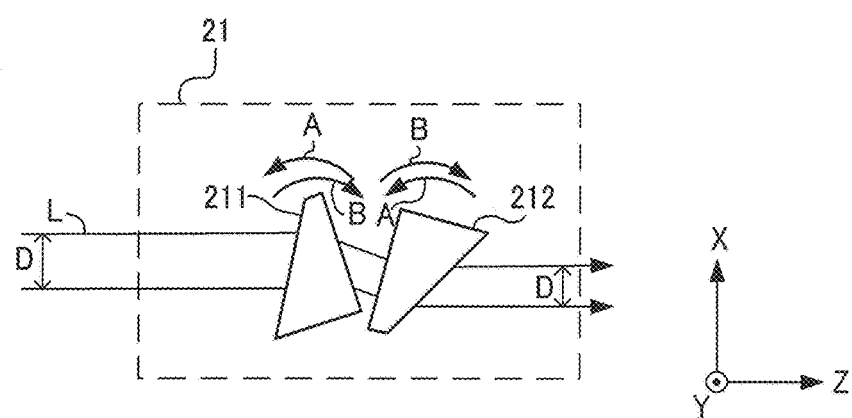
FIG. 2 illustrates a structure of beam resizing device illustrated in FIG. 1.

As illustrated in FIG. 2, the beam resizing device 21 is a double prism including a set of two prisms, that is, a prism 211 and a prism 212, which are transparent bodies made of glass or the like; and, by making use of light refraction, changes the direction of the light to change the diameter of the laser light L in a particular direction.

Here, FIGS. 3A and 3B each illustrate a cross section of the incident beam of the laser light L at a broken line when the prisms 211 and 212 are rotated as follows in FIG. 2.

In FIG. 2, the prism 211 is rotated in an A direction, and the prism 212 is rotated in a B direction. When the prisms 211 and 212 are rotated in such directions, the following results. That is, as illustrated in FIG. 3A, when the beam cross-sectional diameters of the laser light L in the X and Y directions are Rx and Ry, the aspect ratio becomes Rx/Ry<1, as a result of which a beam cross section D of the laser light L is relatively stretched in the Y direction. At this time, since an exiting beam in the X direction is actually narrowed, the aspect ratio becomes Rx/Ry<1.

Similarly, in FIG. 2, when the prism 211 is rotated in the B direction and the prism 212 is rotated in the A direction, the following results. That is, as illustrated in FIG. 3B, the aspect ratio becomes Rx/Ry>1, as a result of which the beam cross section D of the laser light L is stretched in the X direction.

By combining two such operations, the beam resizing device 21 is capable of freely adjusting the diameter Ry along a Y axis, which is the first axis, in the beam cross section D of the incident beam of the laser light L, and the diameter Rx along an X axis perpendicular to the first axis and the optical axis. In other words, the beam resizing device 21 is capable of changing the aspect ratio of the beam cross section D.

Due to such a structure, even if, for example, the incident beam cross section has a distorted shape, since the beam resizing device 21 is capable of forming the beam cross section D of the laser light L into a perfect circle, an ideal beam profile is more likely generated, as a result of which processing precision is increased.

Figure 4:
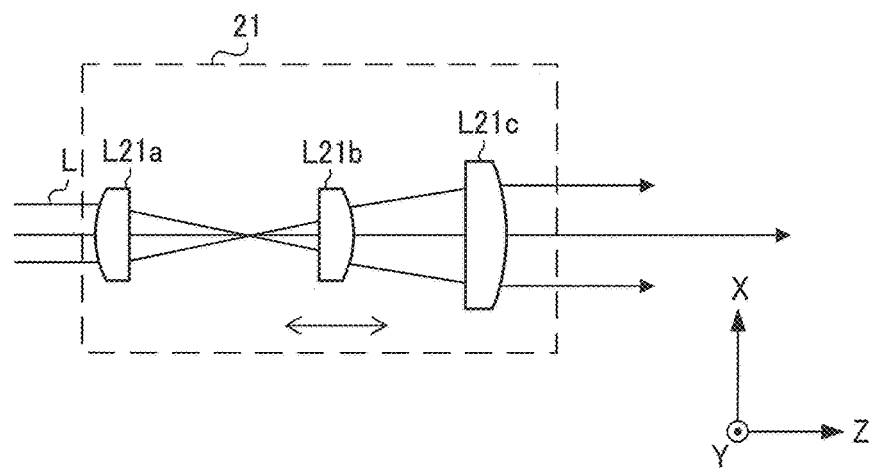
FIG. 4 illustrates a modification of the beam resizing device illustrated in FIG. 1.

As a modification of the beam resizing device 21, a structure, such as that illustrated in FIG. 4, that uses three units of lenses, that is, cylinder lenses L21a, L21b, and L21c may be used. Such cylinder lenses have arcuate shapes including a concave portion or a convex portion on one side. In the Y direction, which is an axial direction of a column, each lens does not have refractive power or has a sufficiently small refractive power. In the X direction that is orthogonal to the Y direction and the direction of the optical axis, each lens increases or decreases the beam diameter by the refractive power provided by the arcuate shape of such a concave portion or a convex portion.

Of such three units of lenses, that is, of the cylinder lenses L21a to L21c, the movable center cylinder lens L21b is moved forward or backward in the Z direction to make it possible to increase or decrease only the beam diameter Rx in the X direction.

Since such a structure makes it possible to increase or decrease only the beam diameter Rx in the X direction with the beam diameter Ry in the Y direction unchanged, such a structure makes it possible to perform a changing operation on the beam diameter in only one of the X direction and the Y direction.

Here, the expression "perform a changing operation" does not mean to similarly enlarge or contract the shape of the beam cross section of the laser light L, but means to dissimilarly deform the shape of the beam cross section to enlarge or contract the shape of the beam cross section of the laser light L.

Due to such a structure, even if, for example, the incident beam cross section has a distorted shape, since the beam resizing device 21 is capable of forming the beam cross section D of the laser light L into a perfect circle, an ideal beam profile is more likely generated.

Figure 5:
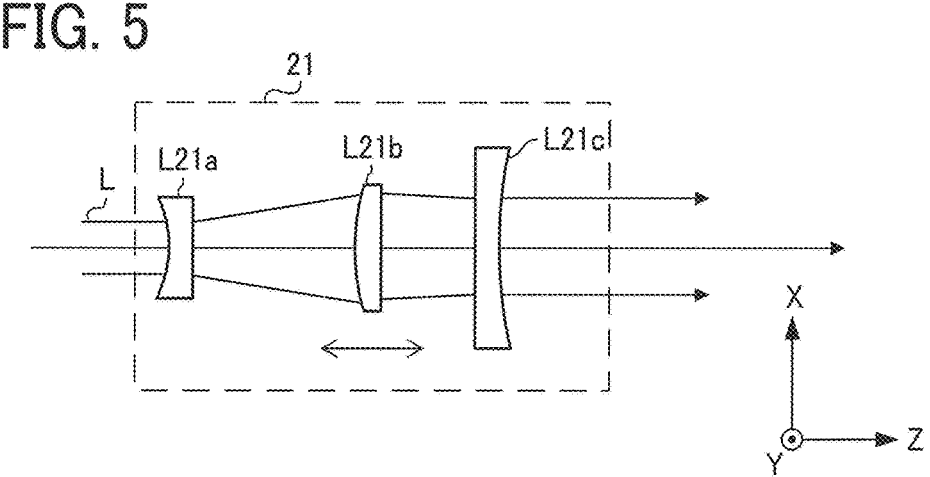
FIG. 5 illustrates a modification of the beam resizing device illustrated in FIG. 1.

When, as illustrated in FIG. 4, the cylinder lenses L21a and L21c are convex lenses, the beam resizing device 21 is called a Kepler three-unit lens system; and when, as illustrated in FIG. 5, the cylinder lenses L21a and L21c are concave lenses, the beam resizing device 21 is called a Galileo three-unit lens system. In both cases, an optical axis displacement is no longer considered.

Aberrations in the Kepler three-unit lens system illustrated in FIG. 4 are even smaller than aberrations in the double prism system already described above. Similarly, since the Galileo three-unit lens system illustrated in FIG. 5 is an optical system that does not condense the laser light L, the Galileo three-unit lens system has a structure that does not easily undergo air breakdown, and is suitable for laser applications, such as femtosecond laser applications, that generate a large peak power (≈large output) in a short time.

Figure 6A:
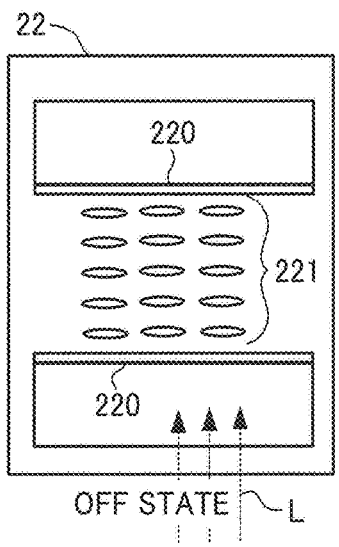
FIGS. 6A and 6B each illustrate a structure of beam wavefront converter illustrated in FIG. 1.
Figure 6B:
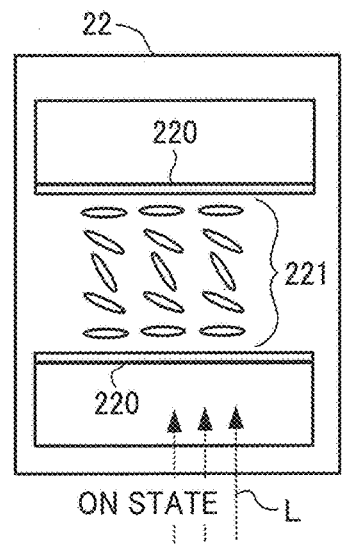

As illustrated in FIGS. 6A and 6B, the beam wavefront converter 22 includes facing transparent electrodes 220 and a liquid crystal 221 applied to a portion between the transparent electrodes 220. The beam wavefront converter 22 is a transmissive liquid-crystal phase modulating element in which, when the direction of orientation of liquid-crystal molecules in a liquid crystal element is varied by an electrical potential distribution, a transmitted wavefront incident upon the liquid crystal element is provided with a corresponding phase difference to modulate the resulting transmitted wavefront. The direction of orientation of the liquid-crystal molecules is varied as in FIG. 6A illustrating an ON state in which a voltage is applied between the transparent electrodes 220 and as in FIG. 6B illustrating an OFF state in which a voltage is not applied between the transparent electrodes 220.

Such a transmissive phase modulating element includes transparent segmented electrodes of a few pixels to several tens of pixels, and is capable of generating a quadratic-functional electrical potential distribution in the entire transmissive surface of the element. When a phase difference is applied in accordance with the electrical potential, the transmissive phase modulating element produces a phase distribution to generate a particular wavefront, such as a wavefront with spherical aberration or astigmatism.

As a result, it is possible to generate a wavefront corresponding to an aberration function of a Zernike polynomial.

Figure 7:
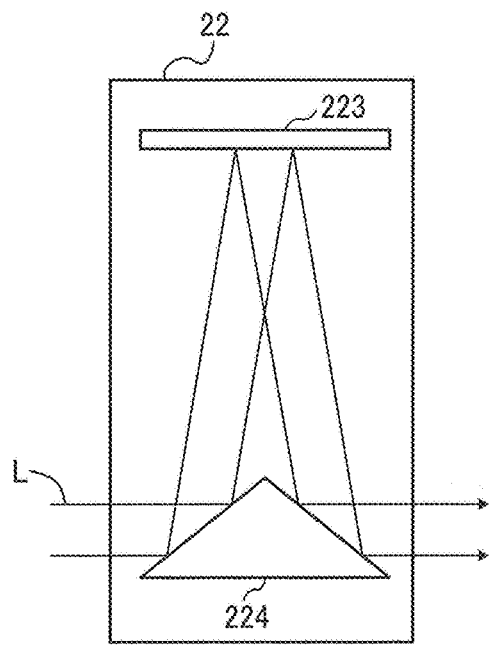
FIG. 7 illustrates another structure of the beam wavefront converter illustrated in FIG. 1.

Alternatively as illustrated in FIG. 7, the beam wavefront converter 22 may use a reflective phase modulating element 223 and a prism mirror 224. If such a reflective phase modulating element 223 is used, it is possible to generate a sophisticated phase distribution by using matrix electrodes.

Figure 8:
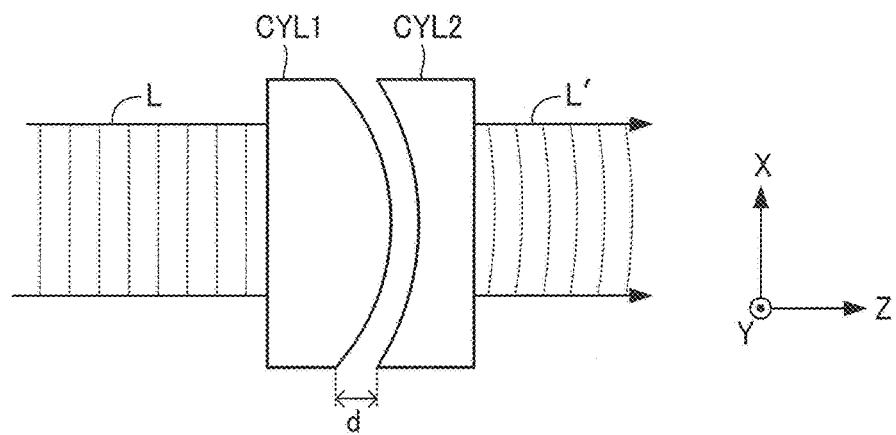
FIG. 8 illustrates another structure of the beam wavefront converter illustrated in FIG. 1.
Figure 9:
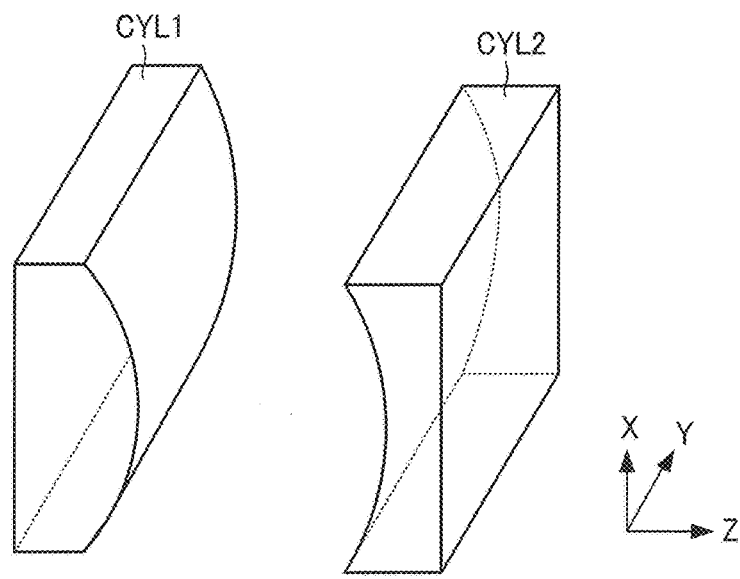
FIG. 9 is a perspective diagram of the structure of the beam wavefront converter illustrated in FIG. 8.

As illustrated in FIGS. 8 and 9, the beam wavefront converter 22 may have a structure using a plurality of anamorphic lenses.

Such a structure uses a plurality of cylinder lenses as optical elements that are rotationally asymmetric with respect to the optical axis and that have different focal positions along the first axis and the second axis, which is orthogonal to the first axis, in the XY plane perpendicular to the Z axis, that is, the optical axis.

The beam wavefront converter 22 illustrated in FIG. 8 includes a plurality of cylinder lenses, that is, a convex cylinder lens CYL1 having a cylinder surface in the X direction and a concave cylinder lens CYL2 in this order in the direction of incidence of the laser light L. Curved surfaces of the two cylinder lenses CYL1 and CYL2 face each other. Such a lens structure is called a concave-convex CYL system.

In the concave-convex CYL system, when the total focal length of the two cylinder lenses is f, the focal length of the cylinder lens CYL1 is f1, the focal length of the cylinder lens CYL2 is f2, and the interval between the two cylinder lenses CYL1 and CYL2 is d, the total focal length f is expressed by Numerical Formula 1:

$$\frac{1}{f} = \frac{1}{f1} + \frac{1}{f2} - \frac{d}{f1 \times f2}$$

That is, the shorter the interval d, the longer the total focal length.

Specifically, when f1=50 mm, f2=−50 mm, and d=0.25 mm, then f=10000 mm. Therefore, it is possible to provide a focal length that is much longer than the values of f1 and f2.

In other words, it is possible to superimpose a cylinder wavefront by a small amount upon a transmitted wavefront that is transmitted through the two cylinder lenses CYL1 and CYL2. That is, as indicated by broken lines in FIG. 8, exiting laser light L' having a curved wavefront with respect to the incident laser light L having a parallel wavefront can be acquired.

A defocusing effect of the condenser lens 60 is combined to also make it possible to produce a zero-degree astigmatic component in the transmitted wavefront.

Further, the interval d is adjusted to make it possible to form a beam such that the ratio of the major-axis diameter with respect to the minor-axis diameter of the laser light L, that is, the aspect ratio of the laser light L becomes relatively small near the convergence position P.

If the beam wavefront converter 22 is formed into such a concave-convex CYL system, the two cylinder lenses are substantially brought into close contact with each other. Therefore, the beam wavefront converter 22 can be compactly designed, and optical axis adjustment is facilitated.

Structures using a plurality of cylinder lenses include, in addition to the concave-convex CYL system, a convex-convex CYL system using two convex cylinder lenses and a concave-concave CYL system.

Figure 10:
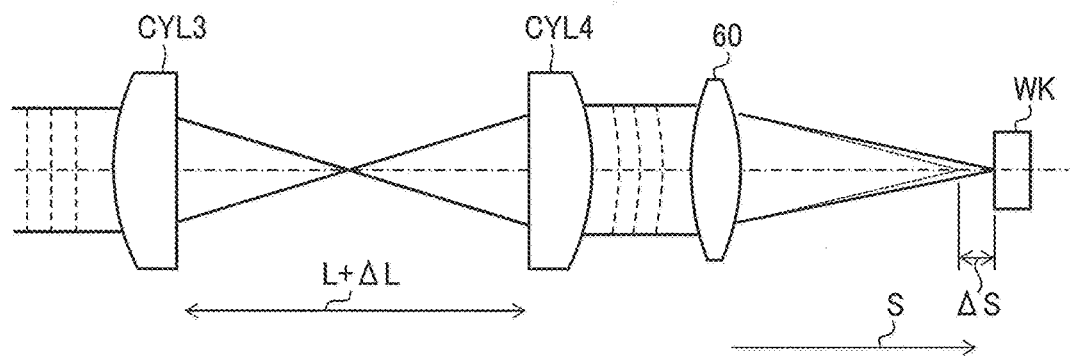
FIG. 10 illustrates an exemplary structure of the beam wavefront converter illustrated in FIG. 1.

As illustrated in FIG. 10, the beam wavefront converter 22, which is a convex-convex CYL system, is an optical system including two cylinder lenses, that is, a cylinder lens CYL3 and a cylinder lens CYL4, each having a cylinder surface in the X direction. The cylinder lens CYL3 and a cylinder lens CYL4 are disposed apart from each other by a distance L+ΔL such that their planar surfaces face each other.

Such a structure is described.

First, when the cylinder lens CYL3 on an incident side is disposed such that its convex surface faces the incident side, the cylinder lens CYL4 on an exit side is similarly disposed such that its convex surface faces the exit side, and the focal position of the cylinder lens CYL3 and the focal position of the cylinder lens CYL4 overlap each other, the wavefront remains flat with a magnification of 1 in the entire optical system. That is, ideally, the condensing positions in the X and Y directions match.

When the distance L between the cylinder lens CYL3 and the cylinder lens CYL4 at this time is adjusted by the very small distance ΔL to slightly change the distance L, it is possible to produce a cylinder wavefront in only the X direction as indicated by broken lines in FIG. 10.

A defocusing effect of the condenser lens 60 is combined to also make it possible to produce a zero-degree astigmatic component in the transmitted wavefront.

Specifically, for example, when the cylinder lens CYL3 on the incident side is a plano-convex cylinder lens made of synthetic quartz and having a focal length of 50 mm, the cylinder lens CYL4 on the exit side is a plano-convex cylinder lens made of synthetic quartz and having a focal length of 50 mm, and the condenser lens 60 is an axisymmetric lens made of synthetic quartz and having a focal length of 100 mm, it is known that Table 1 holds with the cylinder lens interval L being 87 mm, the very small interval being ΔL, and the distance from a first surface of the condenser lens 60 to the condensing point (focal position) being S:

TABLE 1

| Cylinder Lens Interval L + ΔL (mm) | Very Small Interval ΔL (mm) | Focal Position S (mm) | Variation Amount ΔS (mm) From Focal Position As Reference |
|---|---|---|---|
| 87.0 | 0 | 117.131 | 0 |
| 87.1 | 0.1 | 116.622 | 0.509 |
| 87.2 | 0.2 | 116.117 | 1.014 |
| 87.3 | 0.3 | 115.653 | 1.478 |
| 87.4 | 0.4 | 115.112 | 2.019 |
| 87.5 | 0.5 | 114.639 | 2.492 |

As is clear from Table 1, when the cylinder lens interval L+ΔL varies by 0.1 mm, the focal position S varies by approximately 0.5 mm. Such a structure makes it possible to shift the focal position in the X and Y directions. Although, in the embodiment, a structure using a set of two cylinder lenses CYL3 and CYL4 is used, a cemented lens, such as an achromatic lens, may be used, or a combination of two aspherical lenses may be used. Since, such a structure further corrects aberrations, such a structure contributes to increasing processing precision.

Such a convex-convex CYL system allows a very good wavefront to be formed, though the length of an optical path is longer than the length of an optical path in the concave-convex CYL system.

In a structure in which a phase distribution of an incident-beam wavefront is converted by using such cylinder lenses described above, there are limitations as to wavefronts that are convertible, such as wavefronts with zero-degree astigmatism and wavefronts with 45-degree astigmatism, in Zernike polynomials.

However, such wavefronts with astigmatism are the lowest frequency components excluding wavefronts that can be corrected by positional adjustments, such as tilting or defocusing, of the optical elements that make up the illumination optical system 102, and are very important wavefronts in terms of beam quality. The present embodiment makes it possible to efficiently correct astigmatic components of such important wavefronts by using a simple structure.

Figure 11:
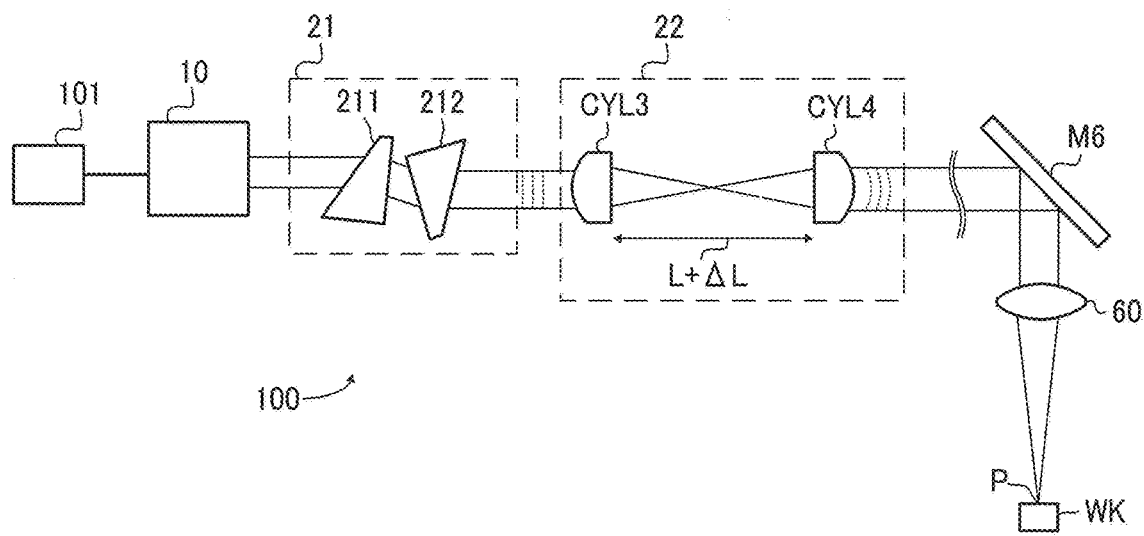
FIG. 11 illustrates a structure of a light illumination device as a first embodiment.

FIG. 11 illustrates a structure that emits a high-quality Gaussian beam by using the light illumination device 100 having the simple structure.

FIGS. 12A, 12B, and 12C are graphs illustrating the results of measurements of beam profiles at condensing positions of the condenser lens 60 when the light source 101 emits light having a wavelength of 532 nm, a maximum output of 8 W, and a frequency of 200 kHz, the diameter of the laser light L is 3 mm after expansion by the beam expander 10, and the focal length of the condenser lens 60 is 100 mm. In the structure of the illumination optical system 102 illustrated in FIG. 10, elements, such as a turn-back mirror, whose influences on, for example, aberrations are very small are not described as appropriate even if they are structures required in terms of optical design.

FIG. 12A illustrates a beam profile under default conditions, that is, conditions in which the aspect ratio Rx/Ry=1 and there are no phase conversions. That is, FIG. 12A illustrates the beam profile serving as a reference for the light source 101 and the illumination optical system 102. In FIGS. 12A to 12C, the defocusing amount in the direction of the optical axis is indicated along the horizontal axis and the results of measurements of the beam diameter are indicated along the vertical axis, when the condensing position of the condenser lens 60 is a center O. Such results illustrate that, in the front of the condenser lens 60, astigmatism occurs, as a result of which beam waist positions, where the beam diameters D become a minimum, in the X and Y directions differ from each other.

FIG. 12B illustrates, as a comparative example, the results of measurements when the astigmatism occurring in FIG. 12A is corrected by using only a structure that merely converts a phase distribution.

Due to such a structure, the beam waist positions in the X and Y directions almost match, whereas the beam waist size is changed.

This is because, by correcting the astigmatism, divergent light is produced in the Y direction and convergent light is produced in the X direction, as a result of which, in front of the condenser lens 60, the incident beam diameter Rx in the X direction is small and the incident beam diameter Ry in the Y direction is large.

Therefore, in the present embodiment, astigmatism is corrected by using the beam wavefront converter 22 and the aspect ratio of the cross section of the incident laser light L is changed by using the beam resizing device 21 to suppress variations in the aspect ratio of the incident beam diameters caused by correcting the astigmatism. As illustrated in FIG. 12C, such a structure is capable of emitting a high-quality laser beam for processing.

Figure 13:
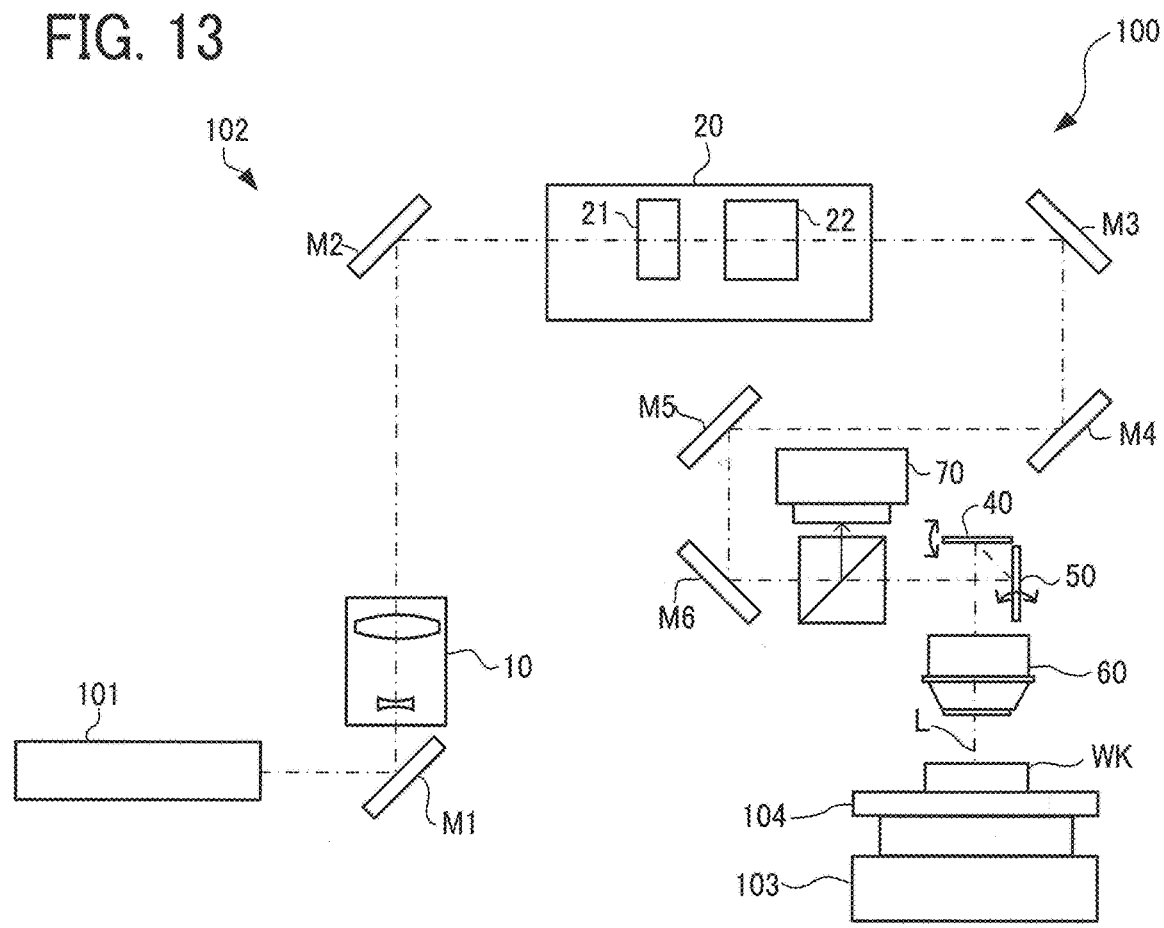
FIG. 13 illustrates a modification of the structure of the light illumination device illustrated in FIG. 1.

As illustrated in FIG. 13, a wavefront sensor 70 disposed right in front of the condenser lens 60 may be used. An ideal position of the wavefront sensor 70 is on the incident side of and right in front of the condenser lens 60; however, the wavefront sensor 70 may be disposed anywhere in the illumination optical system 102. Such a wavefront sensor 70 may be disposed following the condenser lens 60 or in correspondence with the workpiece WK.

Since aberrations of transmitted wavefronts can be measured by using such a wavefront sensor 70, it is possible to expand the phase distribution of wavefront aberration in a Zernike polynomial to correct an aberration component.

That is, by expanding the phase distribution of an aberration amount of a transmitted wavefront measured by such a wavefront sensor 70 in a Zernike polynomial to derive an aberration component, it is possible to convert the phase distribution such that the phase of a part of or the entire aberration component is offset by using the beam wavefront converter 22.

In this way, the beam wavefront converter 22 is adjusted based on the results of measurement of the aberration by the wavefront sensor 70 to make it possible to control the beam profile with higher precision.

Further, by monitoring using the wavefront sensor 70 to control feedback, even if environmental changes occur during processing, the processing can be performed with high precision because a profile corresponding to the environmental changes can be set.

Figure 14:
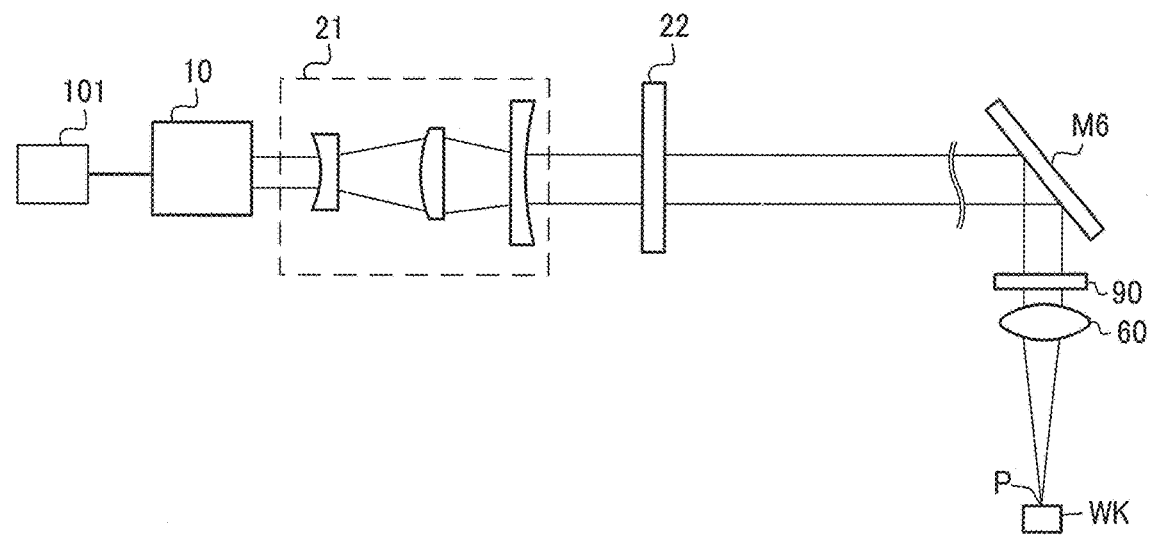
FIG. 14 illustrates a structure of a light illumination device as a second embodiment.

As a second embodiment, FIG. 14 illustrates an example in which a Gaussian beam having the highest beam intensity on the optical axis is converted into a Laguerre-Gaussian beam having a beam intensity that becomes a maximum near a location away from the center of the optical axis.

In the present embodiment, an illumination optical system 102 includes a beam intensity converting element 90, which is a vortex-element diffractive optical element (DOE) disposed right in front of the condenser lens 60.

In the present embodiment, as illustrated in FIG. 5, the beam resizing device 21 is a Galileo three-unit lens system including the cylinder lenses L21a and L21c including concave lenses, and is capable of subjecting the incident laser light L to a changing operation in the X direction by the three cylinder lenses.

The beam wavefront converter 22 is a transmissive liquid-crystal phase modulating element that is disposed in a so-called flat mirror state in which the transmissive liquid-crystal phase modulating element is totally turned off. The illumination optical system 102 is disposed such that the laser light L reaches the workpiece WK via a plurality of mirrors and optical elements. Since the other structures have already been described in the first embodiment, such other structures are not described as appropriate.

Figure 20:
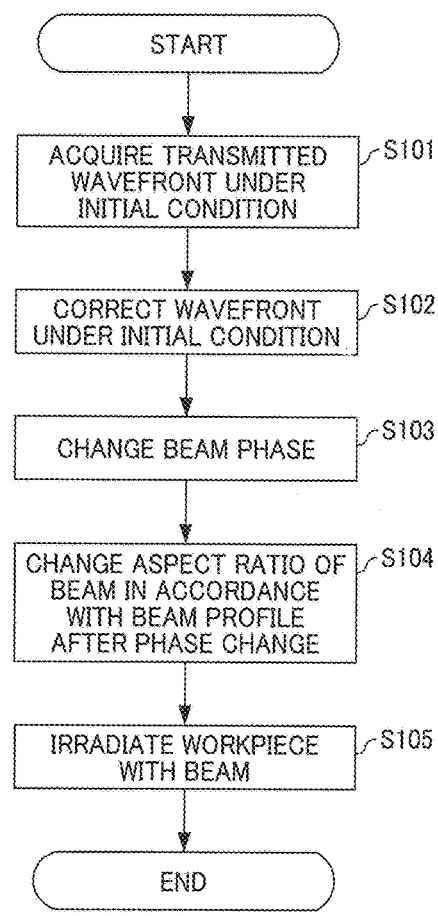
FIG. 20 illustrates operations in a light processing method according to an embodiment of the present disclosure.

In such an embodiment, when the workpiece WK is to be processed with the laser light L, as illustrated in FIG. 20, first, the laser light L in a default state is measured by using a wavefront sensor 70 to measure the phase distribution of an aberration amount of a transmitted wavefront (Step S101).

The beam wavefront converter 22 expands such a phase distribution of the aberration amount in a Zernike polynomial to derive an aberration component (Step S102), and calculates backwards the phase of the wavefront such that the phase of the wavefront aberration of a part of or the entire aberration component is offset to determine, for example, the voltage that is applied to the phase modulating element (Step S103). Such a step is a beam phase changing step of converting the phase distribution of the transmitted wavefront of the laser light L.

At the same time, in order to suppress variations in the aspect ratio of the cross section of the laser light L that have occurred due to the phase control by the beam wavefront converter 22, the beam resizing device 21 moves the cylinder lens L21b and performs a changing operation to set Rx/Ry to an appropriate value (Step S104). Such a step is a beam cross-section changing step of, in the XY cross section perpendicular to the laser-light-L optical axis (the Z axis), changing the ratio between the diameter Rx along the X axis and the diameter Ry along the Y axis.

The beam intensity converting element 90 is, for example, a diffractive optical element (DOE) and is converting means that converts the intensity distribution of the incident laser light L.

It is desirable that aberrations of a transmitted wavefront be properly corrected immediately before the light is incident upon the beam intensity converting element 90. Therefore, it is most desirable that the beam intensity converting element 90 be disposed right in front of the condenser lens 60.

In general, when a DOE is used as the beam intensity converting element 90, it is known that the size of the incident beam with respect to the DOE is determined within a determined range. However, as in the present embodiment, if the beam intensity converting element 90 is disposed right in front of the condenser lens 60, forming the beam into convergent light or divergent light at the front face of the condenser lens 60 makes it possible to produce any beam profile.

The laser light L whose intensity distribution has been changed by the beam intensity converting element 90 is condensed at the convergence position P, which is a position on the workpiece WK to be processed, by the condenser lens 60 (Step S105).

Since such a structure converts a beam cross section of the laser light L in an ideal state into a Laguerre-Gaussian beam, the convergence position P is applied to the workpiece WK by using the condenser lens 60 to make it possible to emit the laser light L having a target beam profile.

Figure 15:
FIG. 15 illustrates a profile of laser light that is output by using the light illumination device illustrated in FIG. 14.

FIG. 15 schematically illustrates the intensity distribution at the convergence position P in accordance with colors by using such an example.

Figure 21:
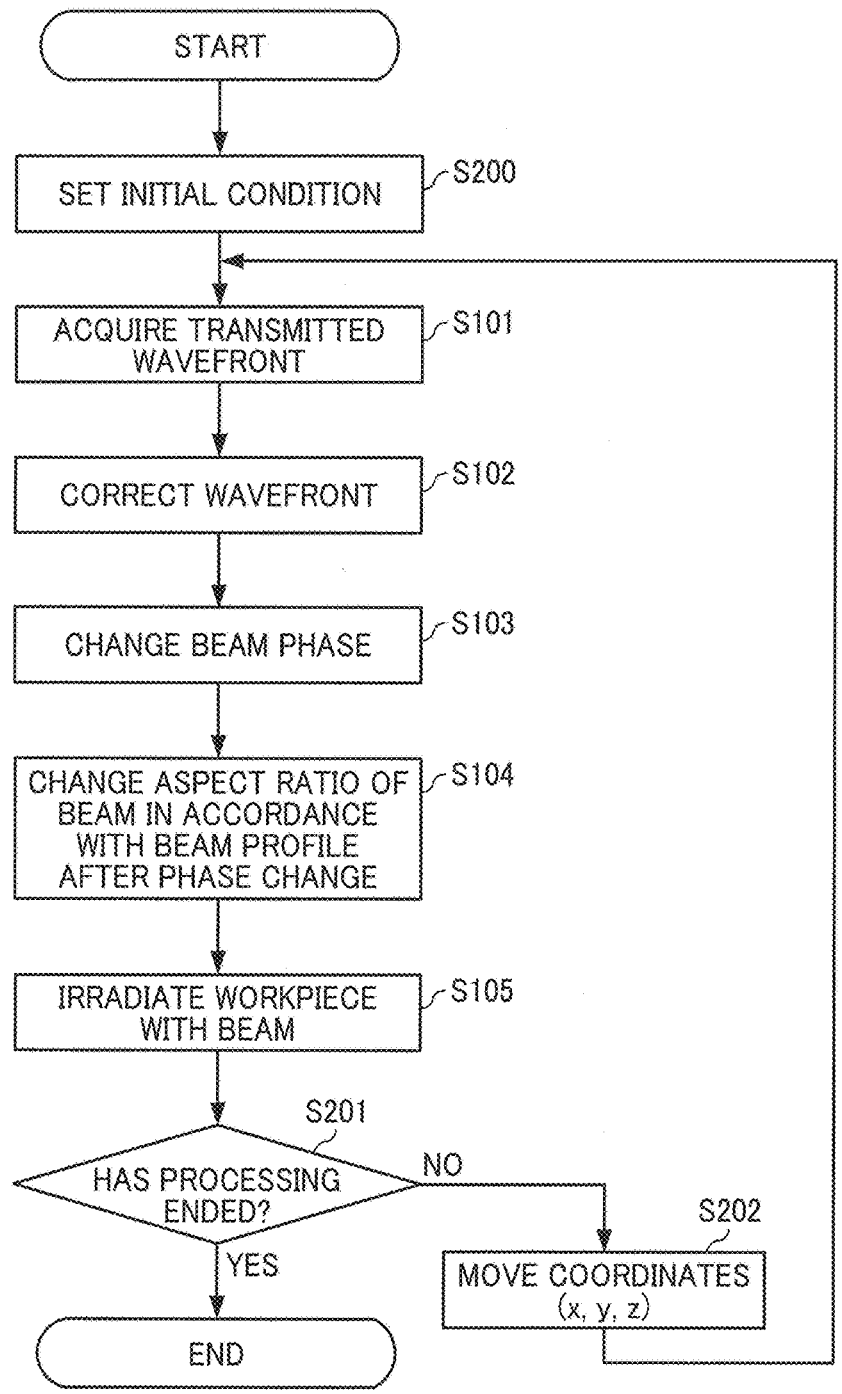
FIG. 21 illustrates other operations in the light processing method according to an embodiment of the present disclosure.

Alternatively, as illustrated in FIG. 21, a light processing method using the laser light L may include Step S200 of setting a beam profile of the laser light L by using a previously provided initial condition, Steps S101 to S105 described above, and Step S201 performed after Steps S101 to S105 to determine whether to end the processing.

Here, when it is determined that the processing has not ended ("no") in Step S201, coordinates (x, y, z) of the convergence position P are changed in Step S202, and a transmitted wavefront is acquired again in Step S101. Since, even during the processing, such a structure is capable of acquiring a transmitted wavefront and correcting the wavefront, such a structure is capable of more precisely producing any beam profile.

Figure 16:
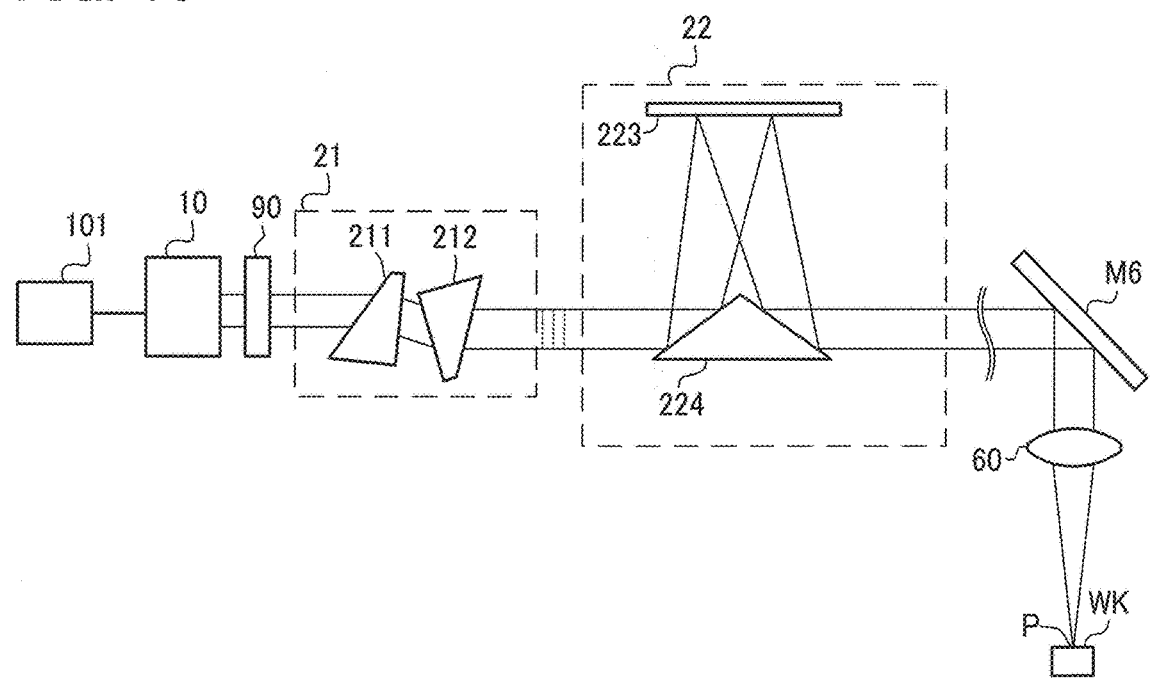
FIG. 16 illustrates a structure of a light illumination device as a third embodiment.

As a third embodiment of the present disclosure, a structure that converts the laser light L into a top-hat beam as illustrated in FIG. 16 is described.

In the present embodiment, a beam intensity converting element 90 is a top-hat-combiner DOE for converting the laser light L into a top-hat beam, and is provided on an exit-side of the beam expander 10.

In the present embodiment, the beam resizing device 21 is a double-prism changing means and uses a so-called double-prism system that independently rotates prisms 211 and 212. Such a structure makes it possible to cause the angle of incidence of a light beam incident upon the prism 211 and the angle of incidence of a light beam incident upon the prism 212 to differ from each other to change the aspect ratio.

In the present embodiment, the beam wavefront converter 22 includes a reflective liquid-crystal phase modulating element 223 and a prism mirror 224.

The laser light L emitted from a light source 101 is enlarged to a desired beam diameter by the beam expander 10, and then is transmitted to the beam intensity converting element 90.

The beam intensity converting element 90 converts the intensity distribution at the cross section of the laser light L into a so-called top-hat beam profile.

Then, when the laser light L is transmitted through the prism 211 and the prism 212, the aspect ratio is changed to a desired aspect ratio in the X and Y directions. Such a step is a beam cross-section changing step of, in the XY cross section perpendicular to the laser-light-L optical axis (the Z axis), changing the ratio between the diameter Rx along the X axis and the diameter Ry along the Y axis.

Then, the laser light L whose aspect ratio has been changed is reflected by the prism mirror 224, is incident upon the liquid-crystal phase modulating element 223, and has its phase changed in accordance with the oriented liquid crystals. Such a step is a beam phase changing step of converting the phase distribution of a transmitted wavefront of the laser light L.

The laser light L is reflected by the prism mirror 224 again, is successively transmitted through the optical elements of the illumination optical system 102, and then illuminates the workpiece WK via the condenser lens 60. Such a step is a condensing step in the present embodiment.

It is known that, when such beam resizing device 21 using a double-prism system is used, the optical axis of the laser light L is shifted. However, the arrangement of the prism mirror 224 and the reflective liquid-crystal phase modulating element 223 is adjusted to make it possible to also correct such an optical axis shift to form a good beam shape.

As a method of adjusting such a beam profile, for example, a method of increasing the plane precision of turn-back mirrors to increase the precision of a transmitted wavefront is also known. However, in order to correct, for example, a slight astigmatism of about $\lambda/10$ by the turn-back mirrors, the surface precisions of the turn-back mirrors used here are increased to about $\lambda/50$, which is, in reality, difficult to realize.

Figure 17A:
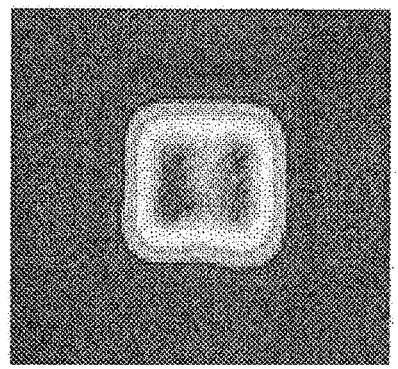
FIGS. 17A to 17C each illustrate an exemplary output of the light illumination device illustrated in FIG. 16.

FIG. 17A illustrates an intensity distribution at the convergence position P on the workpiece WK when a rectangular top-hat beam is emitted by the structure indicated as the third embodiment of the present disclosure.

FIG. 17A illustrates the results of measurement in which the aspect ratio of a beam cross section after correction by using the beam resizing device 21 is in an ideal state of Rx/Ry=1, and in which the phase distribution is brought into an ideal state.

Figure 17B:
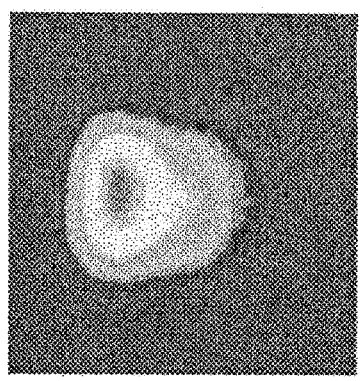
Figure 17C:
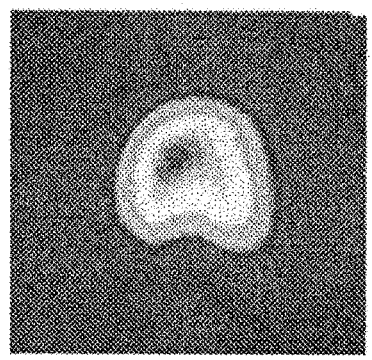

FIGS. 17B and 17C illustrate comparative examples in which the astigmatisms are in a slightly superimposed state from the ideal state of the phase distribution. In such comparative examples, although the amounts by which the astigmatisms are superimposed are very small amounts of less than or equal to $\lambda/10$ at a transmitted wavefront, the amounts influence the shape.

Accordingly, a proper beam profile is reproduced with high precision by using both the beam resizing device 21 and the beam wavefront converter 22 to make it possible to emit the laser light L having a high quality and stable beam profile.

In the present embodiment, it is possible to control the beam profile of the emitted laser light L regardless of the surface precision of the mirrors and optical elements.

In the present embodiment, the beam intensity converting element 90 is disposed right behind the beam expander 10. The beam intensity converting element 90 is disposed on the side of the light source 101, that is, on an upstream side of the illumination optical system 102 to make it possible to ensure high quality on both an incident-beam side and an exiting-beam side of the DOE.

Figure 18:
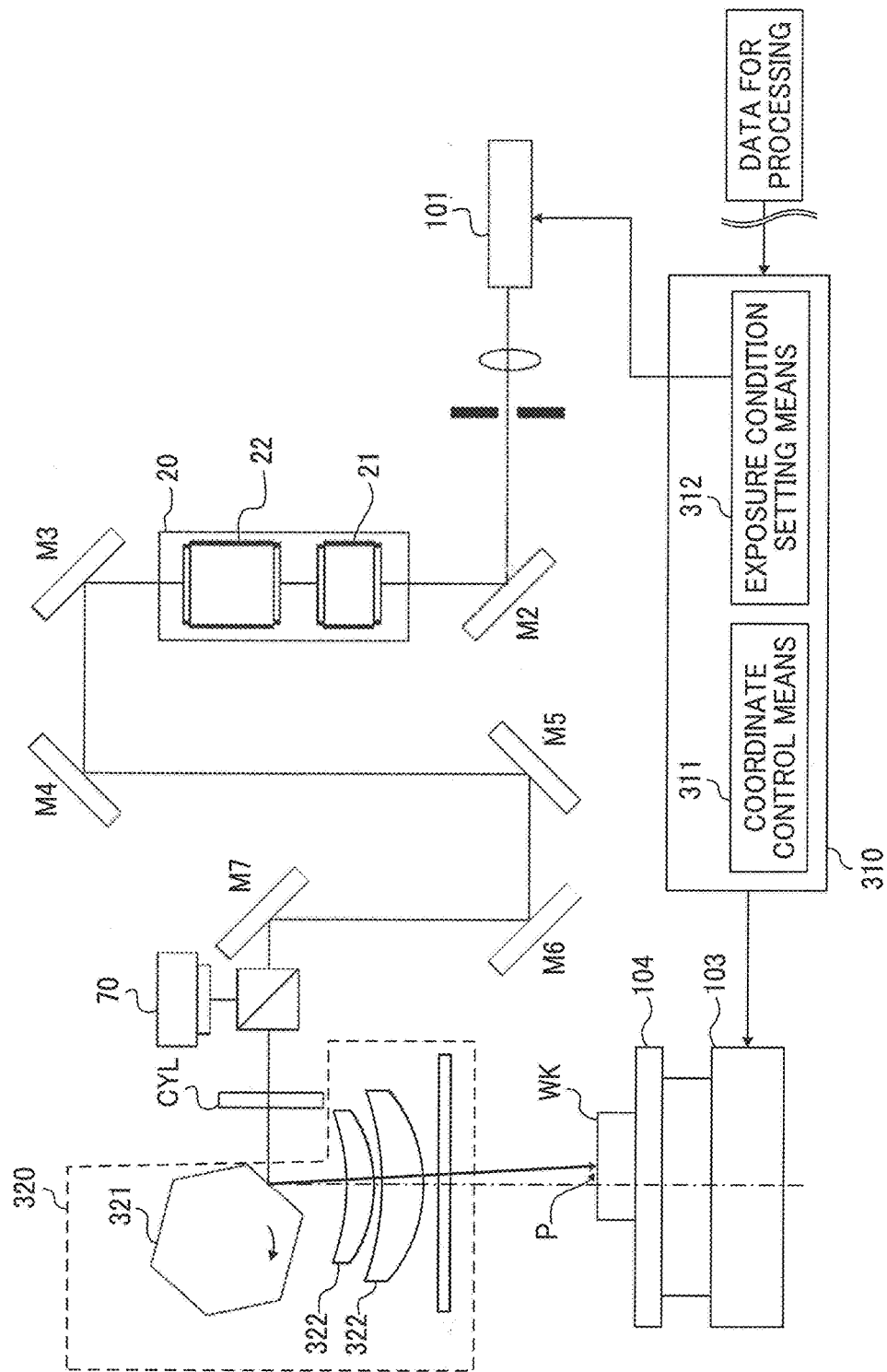
FIG. 18 illustrates a structure of a light processing apparatus according to an embodiment of the present disclosure.

A raster-scanning laser processing apparatus 300 using the light illumination device described above is described by using FIG. 18.

In the present embodiment, in addition to the light illumination device 100 that has already been described, the laser processing apparatus 300 includes a processing control section 310, which is a host computer, for adjusting the position of the workpiece WK, and a scanning optical system 320 that deflects the laser light L emitted from the light illumination device 100 by using a polygon mirror 321 to form scanning light and irradiates the workpiece WK with the scanning light.

The processing control section 310 includes coordinate control means 311 that controls the movable stage 104 to move the workpiece WK to the coordinates of the convergence position P, and exposure condition setting means 312 that controls, for example, the laser-light-L exposure time of the light source 101 in accordance with the material and shape of the workpiece WK.

When processing data, such as image data of an object, formed by, for example, computer-aided design (CAD) is externally input to the processing control section 310, based on such processing-object data, the processing control section 310 selects and determines exposure parameters, such as an exposure region, scanning speed, and light output, by using the exposure condition setting means 312.

In accordance with such exposure parameters, the light source 101 emits the laser light L and the laser light L is incident upon the scanning optical system 320 with the aspect ratio of the cross section of the laser light L and the phase of a transmitted wavefront being controlled with high precision by the beam resizing device 21 and the beam wavefront converter 22, respectively. The beam resizing device 21 and the beam wavefront converter 22 may be any of those described in the first embodiment to the third embodiment above.

The scanning optical system 320 includes the polygon mirror 321 and at least one scanning lens, that is, at least one f$\theta$ lens 322.

The polygon mirror 321 is a polyhedral mirror that rotates at a constant angular velocity, and reflects the laser light L incident upon a side surface of the polygon mirror 321 to continuously apply the laser light L in a main scanning direction. Here, the main scanning direction refers to a direction in which the convergence position P of the laser light L moves due to the rotation of the polygon mirror 321.

Each f$\theta$ lens 322 is a lens that has power in a sub-scanning direction orthogonal to the main scanning direction, and that, when the laser light L is incident upon each f$\theta$ lens 322 at an angle $\theta$, is focused to form an image having a size obtained by multiplying the angle $\theta$ with a focal length f' (H=f·$\theta$) in the main scanning direction. Due to such a structure, even if the polygon mirror 321 rotates at a constant angular velocity, it is possible to apply the laser light L at a uniform scanning speed without the scanning speed being varied by the incident angle of the laser light L.

Such a structure allows the laser light L that has exited from the scanning optical system 320, that is, the convergence position P to move along the surface of the workpiece WK in the main scanning direction C.

Such a structure allows the surface of the workpiece WK to be continuously processed by the laser light L along the main scanning direction C. Such a step is a light processing step of processing an object by condensed light.

At this time, the diameter of the beam spot with which the workpiece WK is irradiated is about several tens of μm to 100 μm, and, in general, the smaller the beam spot diameter, the higher the processing quality.

However, it is known that, when the beam spot diameter is reduced, it becomes increasingly difficult to control the phase and the aspect ratio of the beam and control the convergence position P in the condensing step.

As in the present embodiment, even if the beam spot is small, by making it possible to apply the laser light L having a high-quality and stable beam profile, processing quality is increased.

Figure 19:
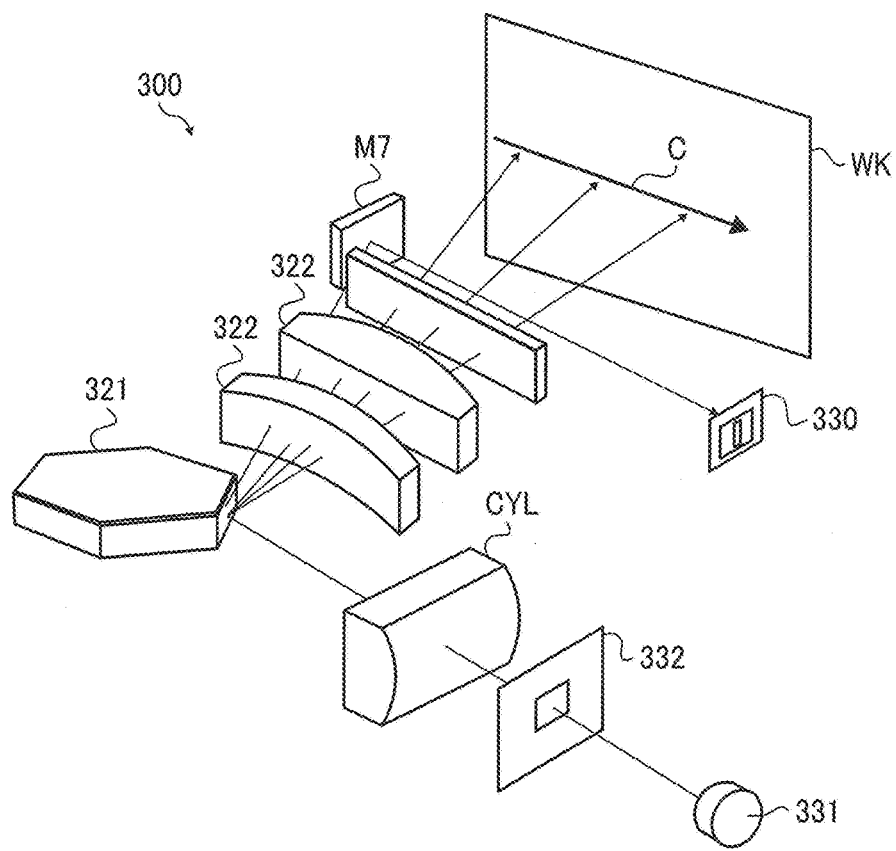
FIG. 19 illustrates another structure of the light processing apparatus illustrated in FIG. 18.

As illustrated in FIG. 19, the laser processing apparatus 300 includes synchronism detecting means 330 on a workpiece-WK side of the fθ lenses 322, which are scanning lenses. Due to such a structure, since a scanning start position can be made the same each time light scans each polygon surface of the polygon mirror 321, it is possible to precisely determine the convergence position P without uneven rotation and shifting of the exposure position.

The laser processing apparatus 300 has an aperture 332 and includes a collimator lens 331. The aperture 332 and the collimator lens 331 are located in front of a cylinder lens CYL.

In the present embodiment, the laser processing apparatus 300 is capable of producing a high-quality and stable object processed with light due to such a structure.

In the present embodiment, the laser processing apparatus 300 is a light processing apparatus that includes the light source 101, which is a pulse laser oscillator, and at least one polygon mirror 321, which is a rotatable scanning mirror. The light processing apparatus converges the laser light L at a desired position via the polygon mirror 321 to process the workpiece WK at the convergence position P.

Such a structure makes it possible to provide a laser processing apparatus that increases throughput without increasing laser power by micromachining using short pulsed laser.

Such a laser processing apparatus makes it possible to perform, in particular, high-speed and very fine processing on workpieces having very small sizes and high processing area ratios and the same target processing depths. Examples of the very fine processing include indium tin oxide (ITO) electrode patterning and silver paste processing, used in touch panels, and light guide plate processing.

As the light processing apparatus used in the present disclosure, in addition to an ITO patterning apparatus, for example, a laser marking apparatus and a 3D printing apparatus are also included. That is, as the light processing apparatus, in addition to an apparatus that performs removal processing, such as a cutting operation or a hole forming operation, an apparatus that performs a processing method like a lamination forming method of applying light and using heat for melting and coagulating is also included.

The invention claimed is:

1. A light illumination device comprising:
a light source configured to emit laser light;
a condenser lens configured to converge the laser light to a convergence position;
a first light controller configured to perform a changing operation on a cross section of an incident beam of the laser light; and
a second light controller configured to convert a phase distribution of a transmitted wavefront of the laser light,
wherein the first light controller includes a plurality of anamorphic lenses, and
wherein a middle lens of the plurality of anamorphic lenses is movable independently of others of the plurality of anamorphic lenses in a direction of an optical axis to perform the changing operation on the laser light.

2. The light illumination device according to claim 1,
wherein, in a cross section perpendicular to an optical axis of the incident beam incident upon the first light controller, the first light controller changes a ratio between a diameter along a first axis and a diameter along a second axis orthogonal to the optical axis of the incident beam and the first axis,
wherein the first light controller and the second light controller are disposed on a side of the light source with respect to the condenser lens, and
wherein, at an incident-side surface of the condenser lens, the laser light has a predetermined cross sectional shape and a predetermined transmitted wavefront.

3. The light illumination device according to claim 1,
wherein the first light controller includes a plurality of prisms, and allows incident angles with respect to the prisms to differ from each other to perform the changing operation on the laser light.

4. A light illumination device comprising:
a light source configured to emit laser light;
a condenser lens configured to converge the laser light to a convergence position;
a first light controller configured to perform a changing operation on a cross section of an incident beam of the laser light; and
a second light controller configured to convert a phase distribution of a transmitted wavefront of the laser light,
wherein the second light controller includes a plurality of anamorphic lenses, and allows an interval between the plurality of anamorphic lenses to change to convert the phase distribution of the transmitted wavefront of the laser light.

5. The light illumination device claim 1,
wherein the second light controller includes a liquid-crystal phase modulating element.

6. A light illumination device comprising:
a light source configured to emit laser light;
a condenser lens configured to converge the laser light to a convergence position;
a first light controller configured to perform a changing operation on a cross section of an incident beam of the laser light;
a second light controller configured to convert a phase distribution of a transmitted wavefront of the laser light;
a wavefront sensor disposed on a side of the light source with respect to the condenser lens; and
a phase distribution controller configured to control the first light controller and the second light controller based on a result of measurement of the wavefront sensor,
wherein the phase distribution controller expands in a Zernike polynomial the phase distribution having an aberration amount of the transmitted wavefront measured by the wavefront sensor to derive an aberration component, and, by using the second light controller, converts the phase distribution such that a phase of a part of or an entirety of the aberration component is offset.

7. The light illumination device claim 1, further comprising
a diffractive optical element,
wherein the first light controller and the second light controller are disposed between the diffractive optical element and the condenser lens.

8. A light processing apparatus comprising:
the light illumination device claim 1; and
at least one rotatable scanning mirror,
wherein the light source includes a pulse laser oscillator, and causes the laser light to converge on a position via the at least one scanning mirror to process an object at the convergence position.

9. The light illumination device according to claim 1, wherein:
the plurality of anamorphic lenses includes at least three groups of cylindrical lenses, one of the at least three groups of cylindrical lenses including the middle lens,
the middle lens of the one of the at least three groups of cylindrical lenses is moved independently of other groups of the at least three groups of cylindrical lenses to enable scaling.

* * * * *